United States Patent
Dalal et al.

(10) Patent No.: US 9,122,692 B1
(45) Date of Patent: Sep. 1, 2015

(54) SYSTEMS AND METHODS FOR REDUCING FILE-SYSTEM FRAGMENTATION WHEN RESTORING BLOCK-LEVEL BACKUPS UTILIZING AN IDENTIFICATION MODULE, AN OPTIMIZATION MODULE, AND A RESTORE MODULE

(75) Inventors: Chirag Dalal, Pune (IN); Vivek Gupta, Pune (IN)

(73) Assignee: Symantec Corporation, Mountain View, CA (US)

( * ) Notice: Subject to any disclaimer, the term of this patent is extended or adjusted under 35 U.S.C. 154(b) by 809 days.

(21) Appl. No.: 13/233,562

(22) Filed: Sep. 15, 2011

(51) Int. Cl.
*G06F 13/00* (2006.01)
*G06F 17/30* (2006.01)
*G06F 11/14* (2006.01)

(52) U.S. Cl.
CPC ...... *G06F 17/30135* (2013.01); *G06F 11/1458* (2013.01)

(58) Field of Classification Search
CPC ............ G06F 11/1453; G06F 11/1469; G06F 17/30156; G06F 17/30159; G06F 11/1448; G06F 11/1458; G06F 17/30135
USPC ......................................... 707/693; 714/4.11
See application file for complete search history.

(56) References Cited

U.S. PATENT DOCUMENTS

| | | | |
|---|---|---|---|
| 7,054,960 B1 * | 5/2006 | Bezbaruah et al. ............. | 710/33 |
| 2012/0136834 A1 * | 5/2012 | Zhao ............................. | 707/649 |
| 2012/0158666 A1 * | 6/2012 | Anglin et al. ................. | 707/679 |
| 2014/0025917 A1 * | 1/2014 | Kaczmarczyk et al. ...... | 711/173 |

* cited by examiner

*Primary Examiner* — Hong Kim
(74) *Attorney, Agent, or Firm* — ALG Intellectual Property, LLC

(57) ABSTRACT

A method for reducing file-system fragmentation when restoring block-level backups may include (1) identifying a block-level backup stored on a backup storage device, (2) determining, by analyzing metadata contained within the block-level backup, that data contained within the block-level backup was physically arranged in a non-optimized manner on the volume from which the block-level backup was originally created due to file-system fragmentation, (3) identifying a request to restore the block-level backup to a target storage device in a block-by-block manner, (4) determining an optimized physical layout within a file system on the target storage device for the data contained within the block-level backup, and then (5) restoring the block-level backup to the target storage device block-by-block in accordance with the determined optimized physical layout in order to reduce the file-system fragmentation identified in the block-level backup. Various other methods, systems, and computer-readable media are also disclosed.

20 Claims, 6 Drawing Sheets

SYSTEMS AND METHODS FOR REDUCING FILE-SYSTEM FRAGMENTATION WHEN RESTORING BLOCK-LEVEL BACKUPS UTILIZING AN IDENTIFICATION MODULE, AN OPTIMIZATION MODULE, AND A RESTORE MODULE

BACKGROUND

Conventional methods for backing up data may be divided into two distinct approaches: file-by-file (also known as "file-level backups") and block-by-block (also known as "block-level" backups). In a file-level backup, each block of data associated with a particular file is sequentially copied onto a backup storage device, irrespective of the original physical location of the block of data on its original storage device. Although file-level backups preserve the file or directory structure of file systems, which allows individual files to be easily accessed and restored, file-level backups fail to preserve the original physical layout of the blocks of data that make up such files.

A block-level backup, in contrast, preserves the original physical layout of data within a volume by copying and backing up such data block-by-block from a volume in the physical order in which it is organized on the volume, without regard to the file or directory structure of any file system on the volume. Although block-level backups may offer a number of advantages over file-level backups (including, e.g., flexibility and/or speed), because block-level backups preserve the original physical layout of data within a volume, block-level backups may also unwillingly preserve data in a non-optimal layout if the data was originally physically arranged on the volume in a non-optimal manner due to file-system fragmentation.

In a storage-backed file system, the blocks of data that make up files within a file system may, even if originally stored in a contiguous (i.e., sequential) manner, become fragmented as these files are modified or deleted and/or as additional files within the file system are added or deleted. Because many storage devices perform substantially better when accessing data sequentially (i.e., accessing physically adjacent units of storage) rather than randomly (i.e., accessing units of storage with arbitrary relative positions), such fragmentation may, over time, result in substantially decreased performance.

Unfortunately, because block-level backups preserve the original physical layout of data within a volume, block-level backups may preserve fragmented data in its fragmented state, even if this data is restored to a new or different storage device. As such, the instant disclosure identifies a need for systems and methods for efficiently reducing file-system fragmentation in block-level backups.

SUMMARY

As will be described in greater detail below, the instant disclosure generally relates to systems and methods for reducing file-system fragmentation in block-level backups during the restore process. In one example, a computer-implemented method for accomplishing such a task may include (1) identifying a block-level backup (i.e., a block-by-block replica or image of a volume) stored on a backup storage device, (2) determining, by analyzing metadata contained within the block-level backup, that data contained within the block-level backup was physically arranged in a non-optimized manner on the volume from which the block-level backup was originally created due to file-system fragmentation, (3) identifying a request to restore the block-level backup from the backup storage device to a target storage device in a block-by-block manner, (4) identifying or determining an optimized physical layout within a file system on the target storage device for the data contained within the block-level backup, and then (5) restoring the block-level backup from the backup storage device to the target storage device block-by-block in accordance with the determined optimized physical layout in order to reduce the file-system fragmentation identified in the block-level backup. In some examples, restoring the block-level backup from the backup storage device to the target storage device block-by-block in accordance with the determined optimized physical layout may render unnecessary the need to perform a separate defragment operation on the target storage device subsequent to restoring the block-level backup.

In some examples, determining that the data contained within the block-level backup was physically arranged in a non-optimized manner on the volume from which the block-level backup was originally created due to file-system fragmentation may include (1) for each block of data contained within the block-level backup, identifying, by analyzing metadata contained within the block-level backup, a file that is associated with the block of data and then (2) for each identified file, determining, by analyzing metadata contained within the block-level backup, whether the blocks of data associated with the file were physically arranged in a non-contiguous manner on the volume from which the block-level backup was originally created.

In one embodiment, determining the optimized physical layout within the file system on the target storage device for the data contained within the block-level backup may include creating a mapping table that identifies new, optimized physical locations on the target storage device for blocks of data associated with files that were arranged in a non-contiguous manner on the volume from which the block-level backup was originally created. In this embodiment, restoring the block-level backup from the backup storage device to the target storage device block-by-block in accordance with the determined optimized physical layout may include restoring the block-level backup from the backup storage device to the target storage device block-by-block in accordance with the new, optimized physical locations identified in the mapping table. In such an embodiment, the method may also include, upon restoring the block-level backup from the backup storage device to the target storage device, updating metadata associated with the file system on the target storage device to reflect the new, optimized physical locations of the files identified in the mapping table.

The backup and target storage devices may represent a variety of types and/or forms of storage devices, including internal storage devices (e.g., a main and/or secondary internal storage device) and/or external storage devices (e.g., a portable storage device, the storage device of a remotely manage computer, a network-attached storage device, a storage device within a storage area network, a cloud-based storage device, or the like).

In one embodiment, a system for implementing the above-described method may include an identification module programmed to identify a block-level backup (i.e., a block-by-block replica of a volume) stored on a backup storage device. The system may also include an optimization module programmed to (1) determine, by analyzing metadata contained within the block-level backup, that data contained within the block-level backup was physically arranged in a non-optimized manner on the volume from which the block-level backup was originally created due to file-system fragmentation and then (2) determine an optimized physical layout within a file system on the target storage device for the data contained within the block-level backup.

The system may also include a restore module programmed to (1) identify a request to restore the block-level backup from the backup storage device to the target storage device in a block-by-block manner and then (2) restore the block-level backup from the backup storage device to the target storage device block-by-block in accordance with the determined optimized physical layout in order to reduce the file-system fragmentation identified in the block-level backup. The system may also include at least one processor configured to execute the identification module, the optimization module, and the restore module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a block-level backup (i.e., a block-by-block replica of a volume) stored on a backup storage device, (2) determine, by analyzing metadata contained within the block-level backup, that data contained within the block-level backup was physically arranged in a non-optimized manner on the volume from which the block-level backup was originally created due to file-system fragmentation, (3) identify a request to restore the block-level backup from the backup storage device to a target storage device in a block-by-block manner, (4) determine an optimized physical layout within a file system on the target storage device for the data contained within the block-level backup, and then (5) restore the block-level backup from the backup storage device to the target storage device block-by-block in accordance with the determined optimized physical layout in order to reduce the file-system fragmentation identified in the block-level backup.

As will be explained in greater detail below, by restoring block-level backups in accordance with a determined optimized physical layout, the systems and methods described herein may avoid the need to perform separate or discrete defragment operations subsequent to restoring such backups. In addition, by physically arranging backed-up data in an optimized manner during the restore process, the systems and methods described herein may achieve superior levels of defragmentation relative to conventional defragmentation methods that are limited to the size and/or free space available on the storage device containing the data that is to be defragmented. Moreover, by reducing file-system fragmentation during the restore process, as opposed to after the restore process and/or prior to or during the backup process, the systems and methods described herein may reduce the amount of time that is typically required to defragment a backed-up volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
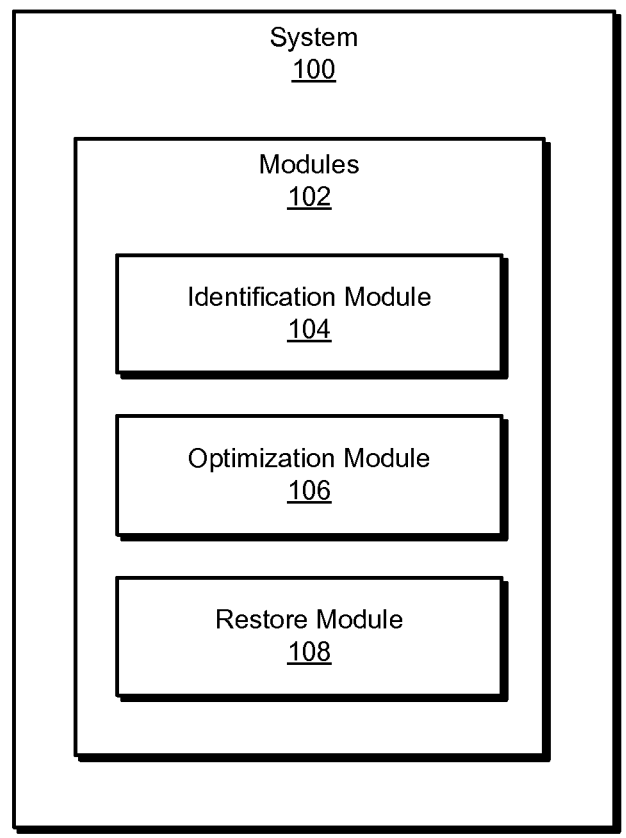
FIG. 1 is a block diagram of an exemplary system for reducing file-system fragmentation when restoring block-level backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
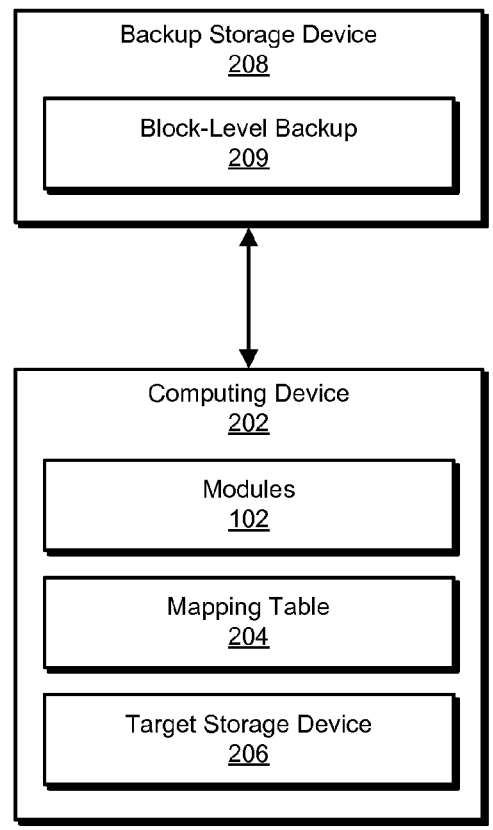
FIG. 2 is a block diagram of an exemplary system for reducing file-system fragmentation when restoring block-level backups.

The following will provide, with reference to FIGS. 1-2, detailed descriptions of exemplary systems for reducing file-system fragmentation when restoring block-level backups. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for reducing file-system fragmentation when restoring block-level backups. As illustrated in this figure, exemplary system 100 may include one or more modules 102 for performing one or more tasks. For example, and as will be explained in greater detail below, exemplary system 100 may include an identification module 104 programmed to identify a block-level backup (i.e., a block-by-block replica of a volume) stored on a backup storage device. Exemplary system 100 may also include an optimization module 106 programmed to (1) determine, by analyzing metadata contained within the block-level backup, that data contained within the block-level backup was physically arranged in a non-optimized manner on the volume from which the block-level backup was originally created due to file-system fragmentation and then (2) determine an optimized physical layout within a file system on the target storage device for the data contained within the block-level backup.

Exemplary system 100 may also include a restore module 108 programmed to (1) identify a request to restore the block-level backup from the backup storage device to the target storage device in a block-by-block manner and then (2) restore the block-level backup from the backup storage device to the target storage device block-by-block in accordance with the determined optimized physical layout in order to reduce the file-system fragmentation identified in the block-level backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup storage device 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup storage 208.

In one embodiment, one or more of modules 102 from FIG. 1 may, when executed by at least one processor of computing device 202, enable computing device 202 to reduce file-system fragmentation when restoring block-level backups. For example, and as will be described in greater detail below, one or more of modules 102 may cause computing device 202 to (1) identify a block-level backup (e.g., block-level backup 209) stored on a backup storage device (e.g., backup storage device 208), (2) determine, by analyzing metadata contained within block-level backup 209, that data contained within block-level backup 209 was physically arranged in a non-optimized manner on a volume from which block-level backup 209 was originally created due to file-system fragmentation, (3) identify a request to restore block-level backup 209 from backup storage device 208 to a target storage device (e.g., target storage device 206) in a block-by-block manner, (4) determine an optimized physical layout within a file system on target storage device 206 for the data contained within block-level backup 209 (as identified by, e.g., mapping table 204), and then (5) restore block-level backup 209 from backup storage device 208 to target storage device 206 block-by-block in accordance with the determined optimized physical layout (as identified by, e.g., mapping table 204) in order to reduce the file-system fragmentation identified in block-level backup 209.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Target storage device 206 and backup storage device 208 may represent a variety of types and/or forms of storage devices, including internal storage devices within computing device 202 (e.g., a main and/or secondary internal storage device within computing device 202) and/or external storage devices that are external to computing device 202 (e.g., a portable storage device, the storage device of a remotely manage computer, a network-attached storage device, a storage device within a storage area network, a third-party or cloud-based storage device or service, or the like).

Figure 3:
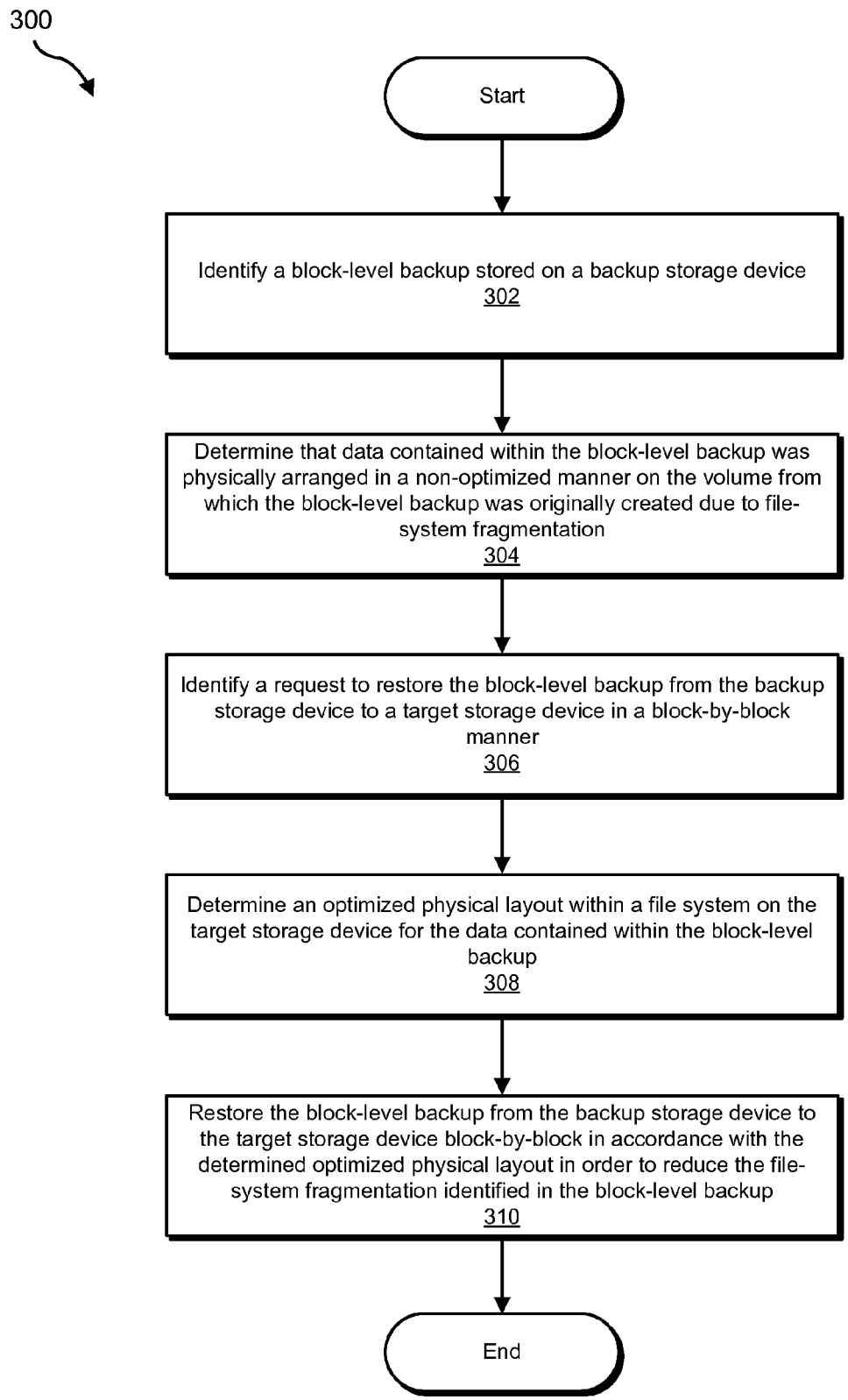
FIG. 3 is a flow diagram of an exemplary method for reducing file-system fragmentation when restoring block-level backups.

FIG. 3 is a flow diagram of an exemplary computer-implemented method 300 for reducing file-system fragmentation when restoring block-level backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the systems described herein may identify a block-level backup stored on a backup storage device. For example, identification module 104 may, as part of computing device 202 in FIG. 2, identify block-level backup 209 stored on backup storage device 208.

The phrase "block-level backup," as used herein, generally refers to a backup in which data is copied block-by-block, as opposed to file-by-file. In general, a block-level backup may preserve the original physical layout of data within a volume by copying and backing up such data block-by-block from a volume in the physical order in which it is organized on the volume, without regard to the file or directory structure of any file system on the volume. A block-level backup (also known as a "disk image" or "image-based backup"), therefore, may represent a block-by-block replica of a volume.

The systems described herein may identify a block-level backup in step 302 in a variety of ways. In one example, identification module 104 may identify a block-level backup (e.g., block-level backup 209) upon creation of the same. In another example, identification module 104 may identify the block-level backup upon receiving a request (from, e.g., a user, administrator, or application) to restore the block-level backup.

At step 304, the systems described herein may determine, by analyzing metadata contained within the block-level backup, that the data contained within the block-level backup was physically arranged in a non-optimized manner on the volume from which the block-level backup was originally created due to file-system fragmentation. For example, optimization module 106 may, as part of computing device 202 in FIG. 2, determine, by analyzing file-system metadata contained within block-level backup 209, that the data contained within block-level backup 209 is physically arranged in a non-optimized manner due to file-system fragmentation.

As used herein, the phrase "file system" may refer to any system for storing and/or organizing data files. As such, a "file system," as that phrase is used herein, may refer to a storage-backed file system, a database file system, a transactional file system, a network file system, a special-purpose file system, or any other suitable file system. Examples of such file systems include, without limitation, FAT, FAT32, NTFS, HFS, HFS+, EXT2, EXT3, ISO 9660, IDS-5, UDF, JFFS2, YAFFS, PROCFS, clients for NFS or SMB protocols, and/or any other suitable file system.

In addition, the phrase "file-system fragmentation," as used herein, generally refers to an inherent phenomenon in storage-backed file systems in which related data is arranged in a non-contiguous (i.e., non-sequential) manner in order to allow the in-place modification of such data. In a storage-backed file system, the blocks of data that make up a file may, even if originally stored in a contiguous manner, become fragmented as the file is modified and/or as additional files within the file system are added or deleted. Unfortunately, because many storage devices perform substantially better when accessing data sequentially (i.e., accessing physically adjacent units of storage) rather than randomly (i.e., accessing units of storage with arbitrary relative positions), such fragmentation may, over time, result in substantially decreased performance.

Figure 4:
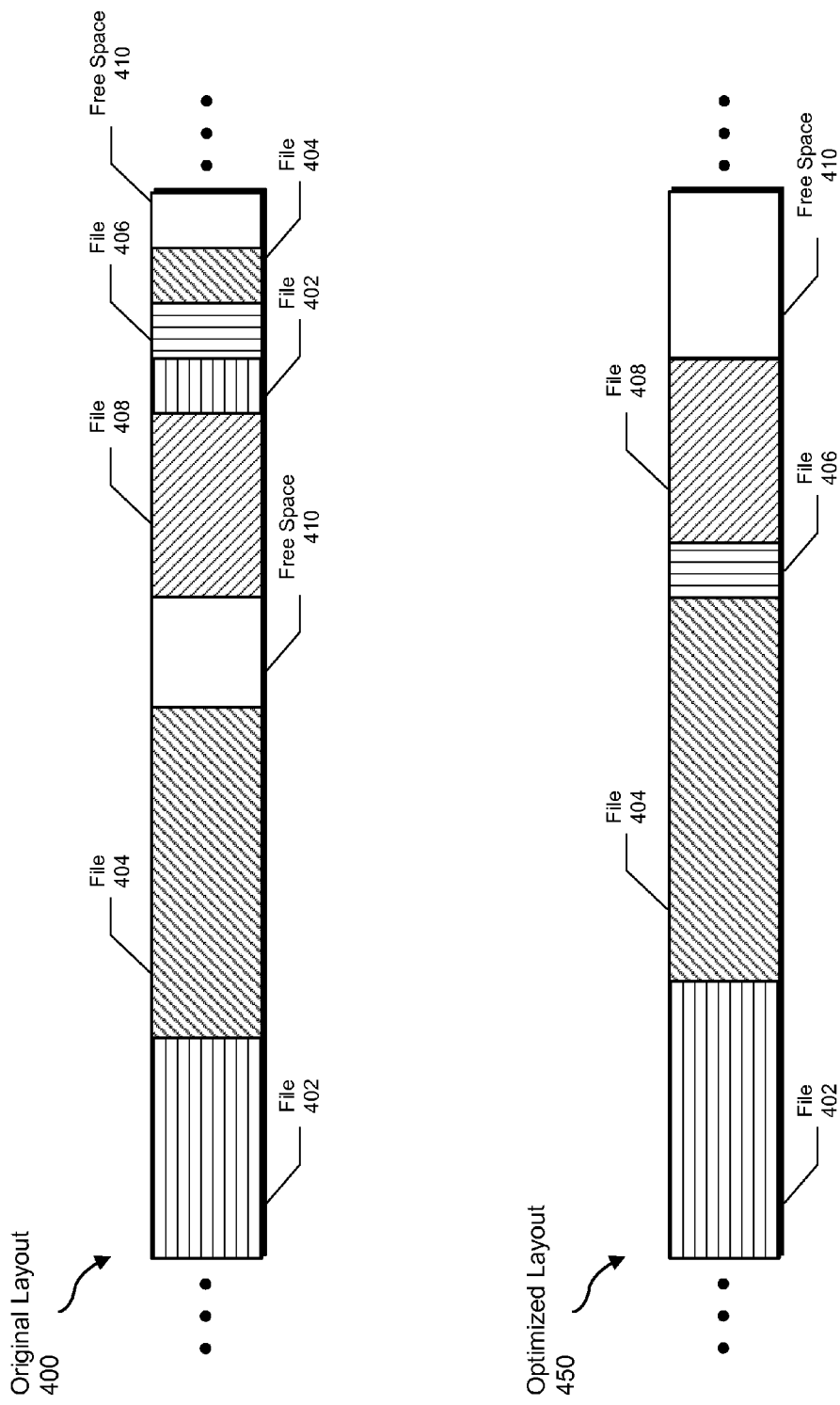
FIG. 4 provides illustrations of exemplary non-optimized and optimized physical layouts for data within a file system on a volume.

FIG. 4 provides an exemplary, simplified illustration of a layout 400 in which data is arranged on a storage device in a non-optimized manner due to file-system fragmentation. As illustrated in this figure, the blocks or clusters of data associated with a particular file may be arranged in a non-contiguous manner due to limitations inherent within a file system responsible for organizing and managing such data. For example, blocks or clusters of data associated with file 402 may be separated by (i.e., arranged in a non-contiguous manner due to) blocks or clusters of data associated with files 404 and 408 and free space 410 due to the storage algorithms used when creating, modifying, and/or deleting these files. Similarly, blocks or clusters of data associated with file 404 may be separated by (i.e., arranged in a non-contiguous manner due to) blocks or clusters of data associated with files 408, 402, and 406 and free space 410 due to the storage algorithms used when creating, modifying, and/or deleting these files. In this example, the non-contiguous manner in which related blocks of data are stored may result in decreased performance.

Returning to step 304, the systems described herein may determine that the data contained within the block-level backup is physically arranged in a non-optimized manner in a variety of ways. In one example, the systems described herein may perform step 304 by (1) for each block of data contained within the block-level backup, identifying, by analyzing metadata contained within the block-level backup, a file that is associated with the block of data and then (2) for each identified file, determining, by analyzing metadata contained within the block-level backup, whether the blocks of data associated with the file were physically arranged in a non-contiguous manner on the volume from which the block-level backup was originally created.

For example, optimization module 106 may identify or ascertain, by analyzing file-system metadata contained within block-level backup 209, the files that are associated with each block or cluster of data contained within block-level backup 209. For example, if block-level backup 209 represents a block-level backup of an NTFS volume, then optimization module 106 may identify and then analyze a Master File Table (MFT) associated with this NTFS volume contained within block-level backup 209. In NTFS volumes, the MFT represents an index that contains entries or records for each and every file or directory stored within the NTFS volume. Each record or entry, in turn, contains a variety of information about its respective file, including information that identifies the physical location on a storage device of each block or cluster of data that makes up the file. Accordingly, by identifying and analyzing the MFT of an NTFS volume within block-level backup 209, optimization module 106 may identify or ascertain the individual files that are associated with each block of data contained within block-level backup 209. In other words, optimization module 106 may identify or effectively re-create at least a portion of the file-system structure or hierarchy contained within the volume from which block-level backup 209 was originally created.

Upon identifying or ascertaining the individual files that are associated with each block of data contained within block-level backup 209, optimization module 106 may then determine the original physical layout of the blocks of data that make up these files (i.e., optimization module 106 may determine how these blocks of data were originally physically arranged within a file system on the volume from which block-level backup 209 was originally created). Upon determining this original physical layout, optimization module 106 may then determine whether blocks of data associated with files within this original physical layout were arranged in a non-contiguous manner. For example, optimization module 106 may determine that blocks of data associated with file 402 in FIG. 4 were originally physically separated by (i.e., arranged in a non-contiguous manner due to) blocks of data associated with files 408, 404, and free space 410 in the original physical layout 400 of the volume from which block-level backup 209 was created. Similarly, optimization module 106 may determine that blocks of data associated with file 404 were originally physically separated by (i.e., arranged in a non-contiguous manner due to) blocks of data associated with files 408, 402, and 406, and free space 410 in the original physical layout 400 of the volume from which block-level backup 209 was created.

Returning to FIG. 3, at step 306 the systems described herein may identify a request to restore a block-level backup identified in step 302 from the backup storage device to a target storage device in a block-by-block manner. For example, restore module 108 may, as part of computing device 202 in FIG. 2, identify a request to restore block-level backup 209 from backup storage device 208 to target storage device 206 block-by-block.

The systems described herein may perform step 306 in a variety of ways. In one example, restore module 108 may identify the request by receiving the request from a user, administrator, and/or application. In another example, restore module 108 may identify an instruction to restore block-level backup 209 from a configuration file.

In some examples, the request may instruct restore module 108 to restore block-level backup 209 to a target storage device that is internal to the computing device from which the request originated (e.g., target storage device 206, which may represent the main or secondary drive of computing device 202). In other examples, the request may instruct restore module 108 to restore block-level backup 209 to a target storage device that is external to the computing device from which the request originated (e.g., a portable storage device, the storage device of a remotely manage computer, a network-attached storage device, a storage device within a storage area network, or the like).

Returning to FIG. 3, at step 308 the systems described herein may identify or determine a new, optimized physical layout within a file system on the target storage device for the data contained within the block-level backup identified in step 302. For example, optimization module 106 may, as part of computing device 202 in FIG. 2, determine an optimized physical layout within a file system on target storage device 206 for the data contained within block-level backup 209.

The systems described herein may perform step 308 in a variety of ways. In one example, the systems described herein may determine a new, optimized physical layout for the data contained within the block-level backup by creating a mapping table that identifies new, optimized physical locations on the target storage device for blocks of data associated with files that were arranged in a non-contiguous manner on the volume from which the block-level backup was originally created. For example, optimization module 106 may create a mapping table 204 that results in an optimized layout 450 in FIG. 4 on target storage device 206 for the data contained within block-level backup 209. As illustrated in FIG. 4, optimized layout 450 may result in the blocks of data associated with files 402, 404, 406, and 408 as well as free space 410 being arranged in a contiguous manner, resulting in decreased file and free-space fragmentation.

The systems described herein may create mapping table 204 in a variety of ways. In one example, optimization module 106 may create mapping table 204 by (1) identifying each block of data contained within block-level backup 209 that is arranged in a non-optimized manner, (2) identifying a new, optimized physical location on target storage device 206 for these blocks of data, and then (3) creating an entry for each of these blocks of data within mapping table 204 that identifies the new, optimized physical locations on target storage device 206 for these blocks of data. In some examples, these new, optimized physical locations may represent contiguous locations for related blocks of data and/or regions of free space, resulting in reduced file and free-space fragmentation.

Mapping table 204 may contain a variety of information. In some examples, mapping table 204 may map each block of data contained within block-level backup 209 to a physical location on target storage device 206. In other examples, mapping table 204 may only contain entries for blocks of data that are to be rearranged or moved (i.e., blocks of data that are to be stored in new, optimized physical locations on target storage device 206).

Returning to FIG. 3, at step 310 the systems described herein may restore the block-level backup identified in step 302 from the backup storage device to the target storage device block-by-block in accordance with the optimized physical layout determined in step 308 in order to reduce the file-system fragmentation identified in step 304. For example, restore module 108 may, as part of computing device 202 in FIG. 2, restore block-level backup 209 from backup storage device 208 to target storage device 206 block-by-block in accordance with mapping table 204.

The systems described herein may perform step 310 in a variety of ways. In one example, restore module 108 may restore data from block-level backup 209 to target storage device 206 block-by-block in accordance with an order specified within mapping table 204. In another example, restore module 108 may restore the blocks of data contained within block-level backup 209 sequentially in the order in which they are encountered, but in accordance with the physical locations identified in mapping table 204.

In some examples, upon restoring the block-level backup from the backup storage device to the target storage device, the systems described herein may update metadata associated with a file system on the target storage device to reflect the new, optimized physical layout. For example, restore module 108 may, upon restoring block-level backup 209 to target storage device 206 in accordance with the physical locations identified in mapping table 204, update file-system metadata contained within target storage device 206 to reflect the new, optimized physical locations of the files identified in mapping table 204. For example, if target storage device 206 represents an NTFS volume, restore module 108 may update an MFT within target storage device 206 to reflect the new, optimized physical locations of the files identified in mapping table 208 (e.g., restore module 108 may update the MFT with the new location of the beginning of each file). Upon completion of step 310, exemplary method 300 in FIG. 3 may terminate.

As detailed above, by restoring block-level backups in accordance with a determined optimized physical layout, the systems and methods described herein may avoid the need to perform separate or discrete defragment operations subsequent to restoring such backups. In addition, by physically arranging backed-up data in an optimized manner during the restore process, the systems and methods described herein may achieve superior levels of defragmentation relative to conventional defragmentation methods that are limited to the size and/or free space available on the storage device containing the data that is to be defragmented. Moreover, by reducing file-system fragmentation during the restore process, as opposed to after the restore process and/or prior to or during the backup process, the systems and methods described herein may reduce the amount of time that is typically required to defragment a backed-up volume.

Figure 5:
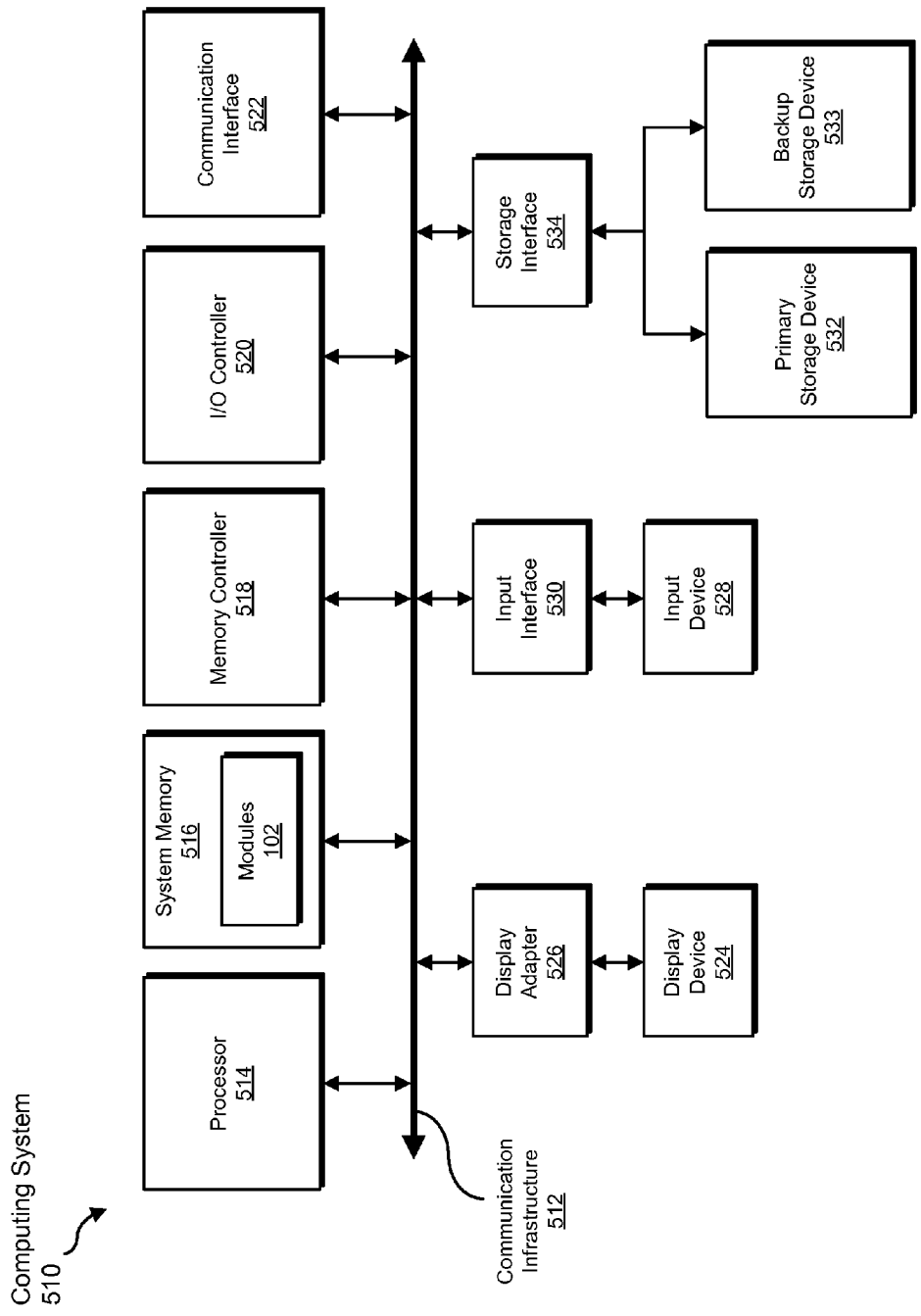
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 410 may perform and/or be a means for performing, either alone or in combination with other elements, one or more of the identifying, determining, analyzing, restoring, creating, and updating steps described herein. All or a portion of computing system 410 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
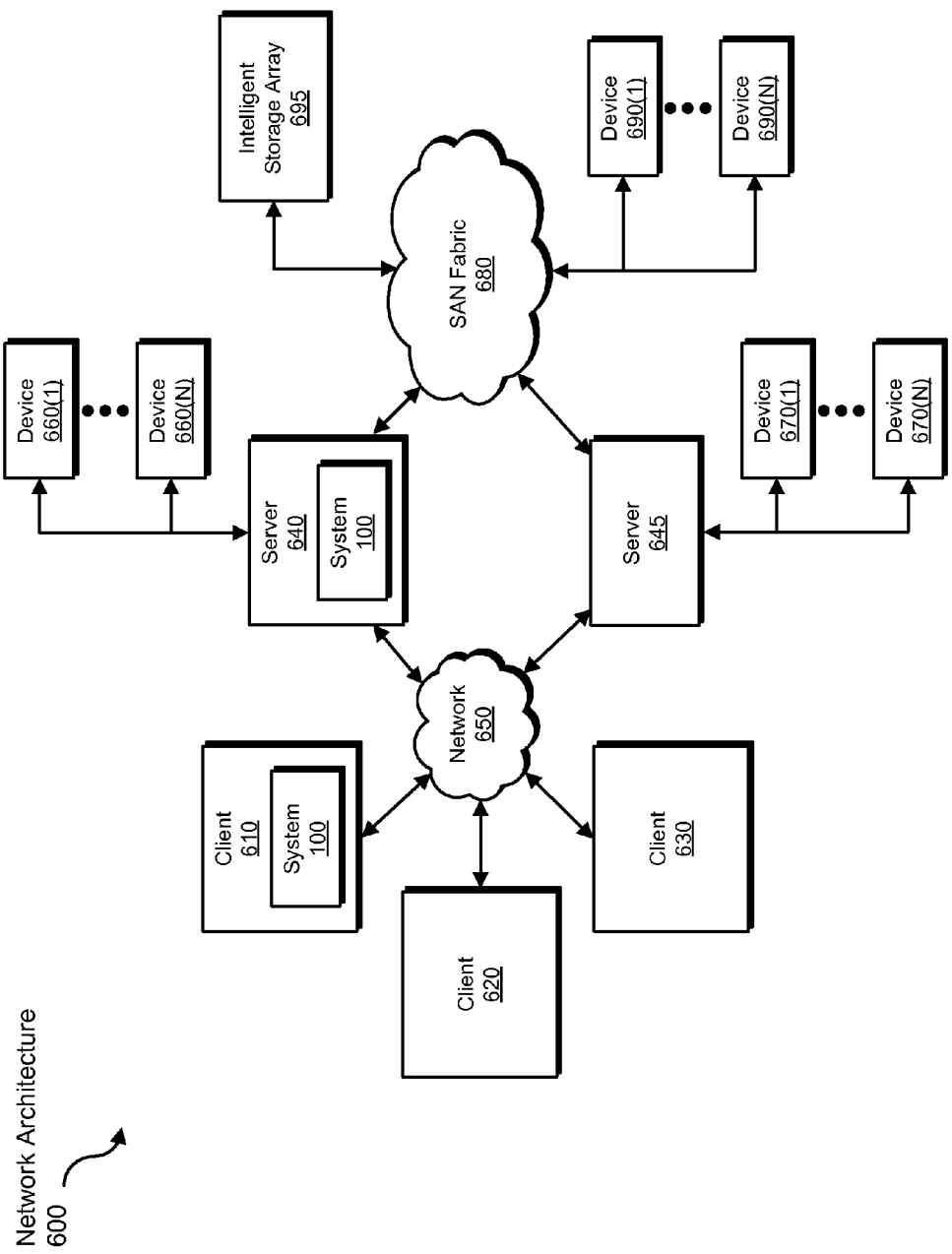
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, analyzing, restoring, creating, and updating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for reducing file-system fragmentation when restoring block-level backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. In particular, while the steps illustrated and/or described herein may be shown or discussed in a particular order, these steps do not necessarily need to be performed in the order illustrated or discussed. For example, exemplary steps 302, 304 and/or 308 in FIG. 3 may be performed prior to, and/or in response to, step 306. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform computing device 202 into a device that is capable of reducing the file-system fragmentation of a block-level backup when restoring the block-level backup.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reducing file-system fragmentation when restoring block-level backups, at least a portion of the method being performed by a computing system comprising at least one processor, the method comprising:
   identifying a block-level backup stored on a backup storage device, the block-level backup comprising a block-by-block replica of a volume;
   determining, by analyzing metadata contained within the block-level backup, that data contained within the block-level backup was physically arranged in a non-optimized manner on the volume from which the block-level backup was originally created due to file-system fragmentation;
   identifying a request to restore the block-level backup from the backup storage device to a target storage device in a block-by-block manner;
   determining an optimized physical layout within a file system on the target storage device for the data contained within the block-level backup;
   restoring the block-level backup from the backup storage device to the target storage device block-by-block in accordance with the determined optimized physical layout in order to reduce the file-system fragmentation identified in the block-level backup.

2. The method of claim 1, wherein determining, by analyzing metadata contained within the block-level backup, that the data contained within the block-level backup was physically arranged in a non-optimized manner on the volume from which the block-level backup was originally created due to file-system fragmentation comprises:
   for each block of data contained within the block-level backup, identifying, by analyzing the metadata contained within the block-level backup, a file that is associated with the block of data;
   for each identified file, determining, by analyzing the metadata contained within the block-level backup, whether the blocks of data associated with the file were physically arranged in a non-contiguous manner on the volume from which the block-level backup was originally created.

3. The method of claim 2, wherein determining the optimized physical layout within the file system on the target storage device for the data contained within the block-level backup comprises creating a mapping table that identifies new, optimized physical locations on the target storage device for blocks of data associated with files that were arranged in a non-contiguous manner on the volume from which the block-level backup was originally created.

4. The method of claim 3, wherein restoring the block-level backup from the backup storage device to the target storage device block-by-block in accordance with the determined optimized physical layout comprises restoring the block-level backup from the backup storage device to the target storage device block-by-block in accordance with the new, optimized physical locations identified in the mapping table.

5. The method of claim 3, further comprising, upon restoring the block-level backup from the backup storage device to the target storage device, updating metadata associated with the file system on the target storage device to reflect the new, optimized physical locations of the files identified in the mapping table.

6. The method of claim 1, wherein determining an optimized physical layout within a file system on the target storage device for the data contained within the block-level backup further comprises physically arranging the data contained within the block-level backup during the restore process according to the optimized physical layout, rendering unnecessary the need to perform a separate defragment operation on the target storage device subsequent to restoring the block-level backup.

7. The method of claim 1, wherein:
   the backup storage device comprises at least one of:
      an internal storage device within the computing system;
      an external storage device that is external to the computing system;
   the target storage device comprises at least one of:
      an internal storage device within the computing system;
      an external storage device that is external to the computing system.

8. A system for reducing file-system fragmentation when restoring block-level backups, the system comprising:
   an identification module programmed to identify a block-level backup stored on a backup storage device, the block-level backup comprising a block-by-block replica of a volume;
   an optimization module programmed to:
      determine, by analyzing metadata contained within the block-level backup, that data contained within the block-level backup was physically arranged in a non-optimized manner on the volume from which the block-level backup was originally created due to file-system fragmentation;
      determine an optimized physical layout within a file system on a target storage device for the data contained within the block-level backup;
   a restore module programmed to:
      identify a request to restore the block-level backup from the backup storage device to the target storage device in a block-by-block manner;
      restore the block-level backup from the backup storage device to the target storage device block-by-block in accordance with the determined optimized physical layout in order to reduce the file-system fragmentation identified in the block-level backup;
   at least one processor configured to execute the identification module, the optimization module, and the restore module.

9. The system of claim 8, wherein the optimization module determines, by analyzing metadata contained within the block-level backup, that the data contained within the block-level backup was physically arranged in a non-optimized manner on the volume from which the block-level backup was originally created due to file-system fragmentation by:
   for each block of data contained within the block-level backup, identifying, by analyzing the metadata contained within the block-level backup, a file that is associated with the block of data;
   for each identified file, determining, by analyzing the metadata contained within the block-level backup, whether the blocks of data associated with the file were physically arranged in a non-contiguous manner on the volume from which the block-level backup was originally created.

10. The system of claim 9, wherein the optimization module determines the optimized physical layout within the file system on the target storage device for the data contained within the block-level backup by creating a mapping table that identifies new, optimized physical locations on the target storage device for blocks of data associated with files that were arranged in a non-contiguous manner on the volume from which the block-level backup was originally created.

11. The system of claim 10, wherein the restore module restores the block-level backup from the backup storage device to the target storage device block-by-block in accordance with the determined optimized physical layout by restoring the block-level backup from the backup storage device to the target storage device block-by-block in accordance with the new, optimized physical locations identified in the mapping table.

12. The system of claim 10, wherein the restore module is further programmed to update metadata associated with the file system on the target storage device to reflect the new, optimized physical locations of the files identified in the mapping table upon restoring the block-level backup from the backup storage device to the target storage device.

13. The system of claim 8, wherein the optimization module is further programmed to physically arrange the data contained within the block-level backup during the restore process according to the optimized physical layout, rendering unnecessary the need to perform a separate defragment operation on the target storage device subsequent to restoring the block-level backup.

14. The system of claim 8, wherein:
the backup storage device comprises at least one of:
an internal storage device within the system;
an external storage device that is external to the system;
the target storage device comprises at least one of:
an internal storage device within the system;
an external storage device that is external to the system.

15. A non-transitory computer-readable-storage medium comprising one or more computer-executable instructions that, when executed by at least one processor of a computing device, cause the computing device to:
identify a block-level backup stored on a backup storage device, the block-level backup comprising a block-by-block replica of a volume;
determine, by analyzing metadata contained within the block-level backup, that data contained within the block-level backup was physically arranged in a non-optimized manner on the volume from which the block-level backup was originally created due to file-system fragmentation;
identify a request to restore the block-level backup from the backup storage device to a target storage device in a block-by-block manner;
determine an optimized physical layout within a file system on the target storage device for the data contained within the block-level backup;
restore the block-level backup from the backup storage device to the target storage device block-by-block in accordance with the determined optimized physical layout in order to reduce the file-system fragmentation identified in the block-level backup.

16. The non-transitory computer-readable-storage medium of claim 15, wherein the computer-executable instructions cause the computing device to determine, by analyzing metadata contained within the block-level backup, that the data contained within the block-level backup was physically arranged in a non-optimized manner on the volume from which the block-level backup was originally created due to file-system fragmentation by causing the computing device to:
for each block of data contained within the block-level backup, identify, by analyzing the metadata contained within the block-level backup, a file that is associated with the block of data;
for each identified file, determine, by analyzing the metadata contained within the block-level backup, whether the blocks of data associated with the file were physically arranged in a non-contiguous manner on the volume from which the block-level backup was originally created.

17. The non-transitory computer-readable-storage medium of claim 16, wherein the computer-executable instructions cause the computing device to determine the optimized physical layout within the file system on the target storage device for the data contained within the block-level backup by causing the computing device to create a mapping table that identifies new, optimized physical locations on the target storage device for blocks of data associated with files that were arranged in a non-contiguous manner on the volume from which the block-level backup was originally created.

18. The non-transitory computer-readable-storage medium of claim 17, wherein the computer-executable instructions cause the computing device to restore the block-level backup from the backup storage device to the target storage device block-by-block in accordance with the determined optimized physical layout by causing the computing device to restore the block-level backup from the backup storage device to the target storage device block-by-block in accordance with the new, optimized physical locations identified in the mapping table.

19. The non-transitory computer-readable-storage medium of claim 17, wherein the computer-executable instructions further cause the computing device to update metadata associated with the file system on the target storage device to reflect the new, optimized physical locations of the files identified in the mapping table upon restoring the block-level backup from the backup storage device to the target storage device.

20. The non-transitory computer-readable-storage medium of claim 15, wherein:
the backup storage device comprises at least one of:
an internal storage device within a computing system;
an external storage device that is external to the computing system;
the target storage device comprises at least one of:
an internal storage device within the computing system;
an external storage device that is external to the computing system.

* * * * *